United States Patent [19]

Tamminen

[11] 4,004,208
[45] Jan. 18, 1977

[54] STARTING AID AND RESERVE LIGHT FOR VEHICLES

[76] Inventor: Pentti Juuse Tamminen, Otsolahdentie 6, 02100 Tapiola, Finland

[22] Filed: July 18, 1975

[21] Appl. No.: 597,046

Related U.S. Application Data

[63] Continuation-in-part of Ser. No. 425,407, Dec. 17, 1973, abandoned.

[52] U.S. Cl. .......................... 320/2; 240/10.6 CH; 307/150; 320/7; 320/16
[51] Int. Cl.² ........................................... H02J 7/00
[58] Field of Search .................................. 320/2–8, 320/15–19, 25, 54, 56; 307/150; 290/50; 240/10.6 CH

[56] References Cited

UNITED STATES PATENTS

| | | | |
|---|---|---|---|
| 3,694,729 | 9/1972 | Jones | 320/2 X |
| 3,763,415 | 10/1973 | Ownby | 320/6 |
| 3,778,632 | 12/1973 | Sarbacher | 290/50 |

*Primary Examiner*—Robert J. Hickey
*Attorney, Agent, or Firm*—Ladas, Parry, Von Gehr, Goldsmith & Deschamps

[57] ABSTRACT

A starting aid and reserve light for vehicles, especially cars. The starting aid comprises at least two identical secondary batteries normally connected in parallel and charged together with the starter battery, when the car is in use. However, a solid state diode prevents the discharge of these batteries together with the starter battery. In case the starter battery is exhausted, being not capable of starting the motor, it can be sufficiently recharged by the starting aid. This is done by means of a switch disconnecting the diode, connecting said secondary batteries in series and simultaneously the resulting double voltage battery in parallel with the starter battery. The starting aid includes a lamp, providing a powerful, portable reserve light.

13 Claims, 3 Drawing Figures

STARTING AID AND RESERVE LIGHT FOR VEHICLES

This is a continuation-in-part of my co-pending application Ser. No. 425,407, filed Dec. 17, 1973, now abandoned.

This invention relates to a starting aid for motors that include an electric starting system comprising a storage battery and a charging generator, such as those used in cars, boats, aeroplanes etc., said starting aid advantageously also comprising a reserve light.

Starting a car sometimes turns out to be a great problem as the result of cold weather, the driver forgetting to turn the lights off, or self-discharge of the battery when the car has not been used for a long time, etc. In modern vehicles which have no provision for cranking by hand there is a real need for some emergency device for starting the motor when the starter battery has run out of power.

In such cases charging the ineffective storage battery with a current in the order of 10 Amp. for a couple of minutes activates the electrode surfaces of the starter battery enough to enable it to start the motor, which normally consumes a charge of about 1000 Amp. sec. (or about 0.3 Amp. hours) of electricity. Cranking, a high current capability of the starter battery is essential, not its Amp. hour capacity. Said charging may be done even with a small dry battery which has enough voltage to allow the voltage drop caused by its internal resistance at such a heavy drain.

As a rule, a car should be equipped with a portable reserve light. However, often when the emergency lamp is needed, locating it takes some time and effort, as it has no fixed place. Once it is found, it may not work properly because the batteries are too old or discharged.

One object of this invention is to provide an effective starting aid for cars, boats etc. A further object is to provide a powerful and reliable reserve light for cars, boats etc., that is readily available when needed.

These objects are mainly accomplished by providing a preferably compact unit comprising at least two similar rechargeable batteries of about the same voltage as, but of essentially smaller current capability than the starter battery. Said rechargeable batteries are also called secondary batteries in the following description, to distinguish them from the starter battery. The secondary batteries are normally connected in parallel and in floating charge together with the starter battery through a solid state diode, said unit incorporating a switch by means of which the secondary batteries can be temporarily connected in series and so formed double voltage battery simultaneously in parallel with the starter battery that is thus being effectively charged by said combined secondary batteries.

If the starter battery is for some reason discharged, the solid state diode prevents the simultaneous discharge of the secondary batteries of the starting aid unit.

The starting aid unit is preferably provided with a lamp and a switch connecting it to the secondary batteries, and also by such contact means enabling the unit to be easily removed and used as a portable reserve lamp.

As an example, an embodiment of the invention is featured in the attached drawing, in which.

Figure 1:
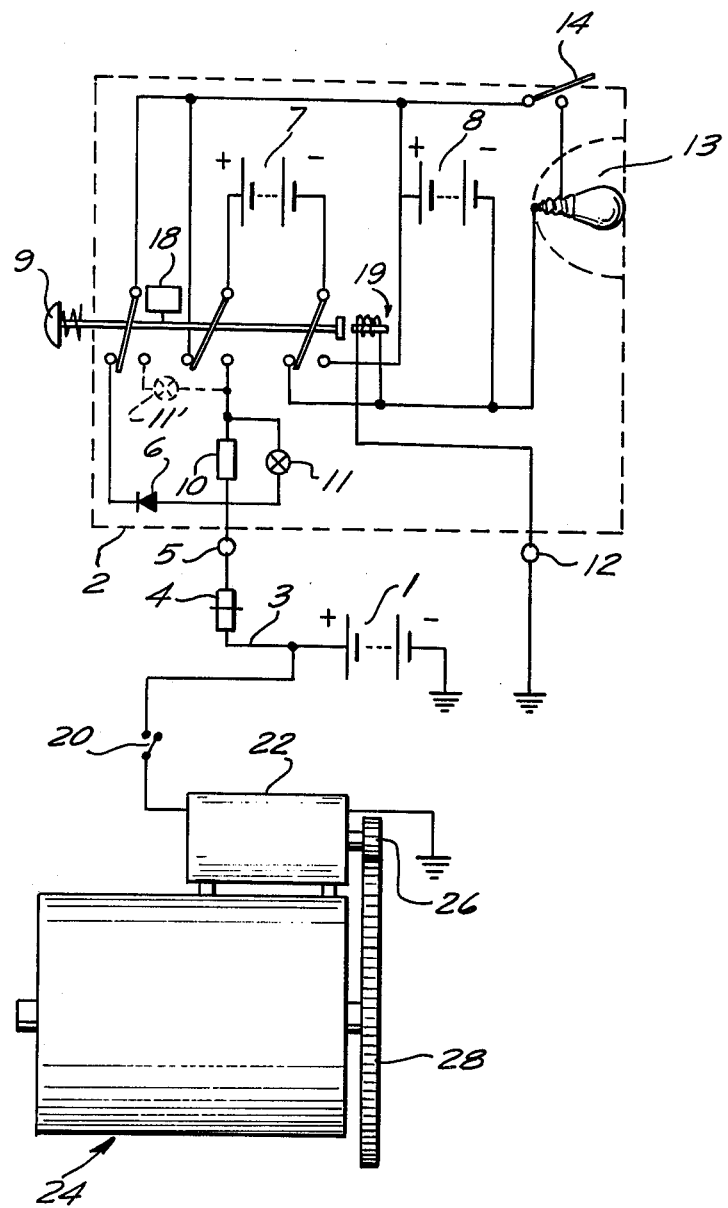
FIG. 1 is a diagram of a unit embodying features of the present invention, connected to the starter battery and starter motor of a car.

In FIG. 1, 1 is a starter battery of a car, usually a lead-acid battery of 12 volts that has a capacity of from about 25 to 50 Amp. hours and a current capability of about 200 Amps. The positive terminal of the starter battery is connected through a conventional solenoid switch 20 to one terminal of a starter motor 22. The other terminal of the starter motor is grounded, and the starter motor is mounted on the car's engine 24. The starter motor incorporates a conventional Bendix-type drive (not shown) and has a drive pinion 26 which meshes with peripheral gearing on the engine's flywheel 28 when the starter motor operates to start the engine and which withdraws from engagement with the peripheral gearing when the engine is running.

The positive terminal of the starter battery is also connected to a starting aid unit 2 by a lead 3 and through a fuse 4 and a contact spring or plug 5 that is safely insulated from the chassis of the car. Through a solid state diode 6 said positive terminal of the starter battery 1 is further connected to the positive terminals of two identical batteries 7 and 8 of about 12 volts each, provided that a spring loaded change-over switch 9 is in normal position as shown in the picture. The switch 9 may advantageously be provided with suitable means 18, e.g., a clockwork, to return it after a predetermined charging period to normal position, in order to safeguard the batteries 7 and 8 from excessive discharge. The means 18 may comprise a conventional timer provided with a circular dial having an opening the size of the switch button to release the button after a predetermined time. Return of the switch 9 may also be accomplished by means of a relay 19 which may be arranged to automatically release the change-over switch to its normal position when the charging current drops to a predetermined value, e.g. 0.5 Amp. If the switch 9 is pushed in, the batteries 7 and 8 will be connected in series and the resulting 24 volt battery at the same time in parallel with the starter battery 1, charging it through a resistor 10 in the order of 0.1 to 1 Ohms., over which there is an indicator lamp 11. Alternatively, the indicator lamp may be connected as shown by the dotted lines 11'. The current path is completed by a contact spring or plug 12 to the chassis of the car, to which the negative terminal of the battery 1 is also connected. Contacts 5 and 12 may preferably be formed as conical springs and metal plates respectively, whereby the weight of the starting aid unit maintains the connection. An addition of a 12 volt lamp 13 and a switch 14 makes the starting aid unit also a portable lantern.

The main purpose of the device according to the present invention is to recharge a battery that has run out of power, especially a starter battery for a motor, to such an extent that the starter battery again is capable of starting the motor. This is achieved very simply by means of a change-over switch connecting the secondary batteries in series to double the output voltage of the device, whereupon charging of the starter battery immediately begins.

When a battery is charged by another battery of higher voltage there is always a great risk that the charging current will be too strong and thus damage or completely destroy the primary battery or repeatedly blow fuses. Therefore a provision must be made to limit the charging current. In the device according to the present invention, there is provided a resistor 10 through which the charging current flows. This resistor is preferably of 0.1 to 1 Ohms. depending on the properties of the secondary batteries. When Ni-Cd batteries are used the resistor should be of about 1 Ohm to cause a voltage drop of 10 V for a charging current of 10 A.

In such an arrangement there will, however, in said resistor be a loss of up to 100 W which represents a slight drawback. In a preferred embodiment of the present invention, therefore, relatively small, partially rechargeable alkaline $MnO_2$-Zn batteries are used as secondary batteries. Such batteries have the advantage that their output voltage is a function of the output current in such a way that strong currents cause the voltage to drop and thereby the charging current automatically will set at a value of 2–10 Amp. depending on the state of the battery to be recharged. Thus because of the small current capability of these batteries the resistor 10 may be omitted.

It should also be noted that the device according to the present invention works simply by means of a change-over switch without any external plugs or leads. The reserve light can be switched on in a similarly simple manner.

Figure 2:
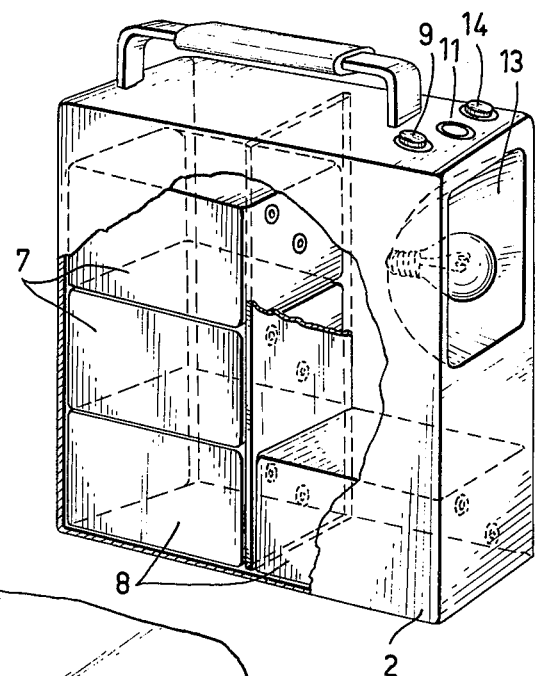
FIG. 2 is schematic illustration of a possible layout of the main components featured in FIG. 1.

FIG. 2 shows schematically one example of a practical solution of the combined starting aid and reserve light according to FIG. 1. The batteries 7 and 8 are advantageously made of two hermetically sealed 6 volt, 4 F size alkaline manganese dioxide-zinc batteries which are connected in series and which each have a rechargeable capacity of about 3 Amp. hours and a current capability of about 10 Amps. These batteries, such as described in my copending U.S. patent application No. 413,288, are cheap and well adapted to a floating charge in connection with a lead acid battery. They can be used in any position and need no maintenance. With such batteries the weight of the starting aid unit would be about 5 lbs. However, it has proved to be an effective battery charger when needed. A voltage reduction of about 0.7 volts at the diode 6 conveniently prevents overcharging of the secondary batteries. The batteries 7 and 8 have a charging capacity of about 10 Amp. hours, when used beyond the rechargeable capacity limit.

Because of the small current capability of these manganese dioxide-zinc batteries, about 5 percent of the current capability of the starter battery the current charging the starter battery automatically will set below a value of 10 Amp. Thus the resistor 10 may be omitted when such batteries are used as secondary batteries.

Of course other sealed, secondary batteries may be used. If the total internal resistance of batteries 7 and 8 is in the order of 1 Ohm., the resistor 10 may be replaced by a copper wire and the indicator lamp circuit 11 by the alternative circuit 11′.

The starting aid is also preferably provided with carrying means, e.g. a handle, in order to make the starting aid conveniently portable.

Figure 3:
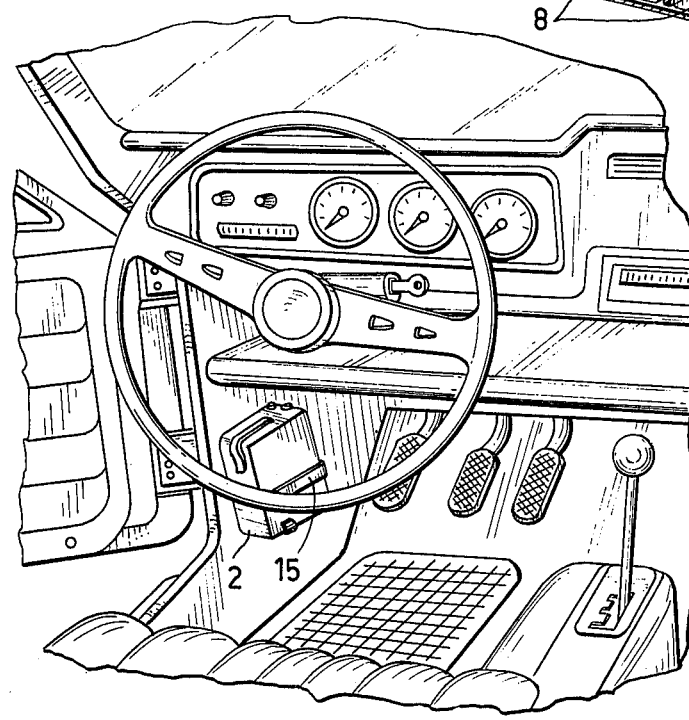
FIG. 3 shows how a unit according to the invention may be fixed in a car.

FIG. 3 shows how a combined starting aid and reserve light 2 according to FIG. 2 may be fixed in car by means of a rack 15 comprising contact plugs or springs 5 and 12 indicated in FIG. 1 (not shown in FIG. 3).

From the foregoing it is readily apparant that the device provided by the invention is simple in structure and reliable in operation. When used in connection with a car, a boat etc., a powerful and handy reserve light with fully charged batteries is always immediately available. If the starting of the motor fails, an effective charging current can be fed to the starter battery making it alive again, just by pressing the spring loaded button 9.

The lamp 13 and the switch 14 may be omitted when the starting aid is applied to a motor, in connection with which a reserve light is not necessary. In that case the device does not need to be portable, but may be permanently included in the machinery.

Within the scope of the invention, the described unit 2 may also be equipped with a flashing light, such as those used as traffic warning signals, or with fluorescent lamp, that can be used as a camping light, etc.

I claim:

1. A starting aid for motors having a starting battery comprising
    a. starting aid terminals connected to corresponding terminals of the starter battery;
    b. at least two secondary batteries normally connected in parallel between said starting aid terminals, the positive terminals of said secondary batteries being connected to the positive terminal of the starter battery and the negative terminals of said secondary batteries being connected to the negative terminal of the starter battery, said secondary batteries being sealed, at least partially rechargeable batteries having a current capability substantially smaller than the starter battery;
    c. a change-over switch for interrupting the parallel connection of said secondary batteries and connecting said secondary batteries in series between said starting aid terminals;
    d. discharge preventing means for preventing said secondary batteries, when connected in parallel, from discharging through said starting aid terminals; and
    e. discharge allowing means connecting said secondary batteries, when connected in series, with said starting aid terminals.

2. A starting aid according to claim 1, wherein said secondary batteries are substantially identical.

3. A starting aid according to claim 1, wherein each of said secondary batteries is of substantially the same voltage as the starter battery.

4. A starting aid according to claim 1, wherein said secondary batteries are alkaline manganese dioxide-zinc batteries.

5. A starting aid according to claim 1, wherein said change-over switch is provided with means for returning the switch to the position in which the secondary batteries are connected in parallel when the charging current provided by the secondary batteries connected in series has dropped to a predetermined value.

6. A starting aid according to claim 1, wherein said discharging preventing means and said discharge allowing means are connected in different current paths connecting one terminal of the starter battery with said secondary batteries, when these are coupled in parallel, and in series, respectively.

7. A starting aid according to claim 1, wherein said change-over switch is provided with means for returning the switch to the position in which the secondary batteries are connected in parallel when the secondary batteries have been connected in series for a predetermined time.

8. A starting aid according to claim 1, wherein said discharge preventing means comprises a solid state diode.

9. A starting aid according to claim 1, wherein said discharge allowing means comprises a resistor.

10. A starting aid according to claim 6, further comprising an indicator lamp to indicate when said secondary batteries discharge through said starting aid terminals.

11. A starting aid according to claim 1, further comprising a lamp and a switch means for connecting said lamp to said secondary batteries, to make the starting aid also usable as a reliable reserve light.

12. A starting aid according to claim 1, further comprising carrying means making the starting aid conveniently portable.

13. In combination, an internal combustion engine, an electric starter motor which can be connected drivingly to the internal combustion engine to start the engine and be disconnected from the internal combustion engine when the engine is running, a starter battery connectable to the starter motor to drive the starter motor, and a starting aid unit, said starting aid unit comprising:

a. starting aid terminals connected to corresponding terminals of the starter battery;

b. at least two secondary batteries normally connected in parallel between said starting aid terminals, the positive terminals of said secondary batteries being connected to the positive terminal of the starter battery and the negative terminals of said secondary batteries being connected to the negative terminal of the starter battery, said secondary batteries being sealed, at least partially rechargeable batteries having a current capability substantially smaller than the starter battery;

c. a change-over switch for interrupting the parallel connection of said secondary batteries and connecting said secondary batteries in series between said starting aid terminals;

d. discharge preventing means for preventing said secondary batteries, when connected in parallel, from discharging through said starting aid terminals; and e. discharge allowing means connecting said secondary batteries, when connected in series, with said starting aid terminals.

* * * * *